Patented Feb. 15, 1938

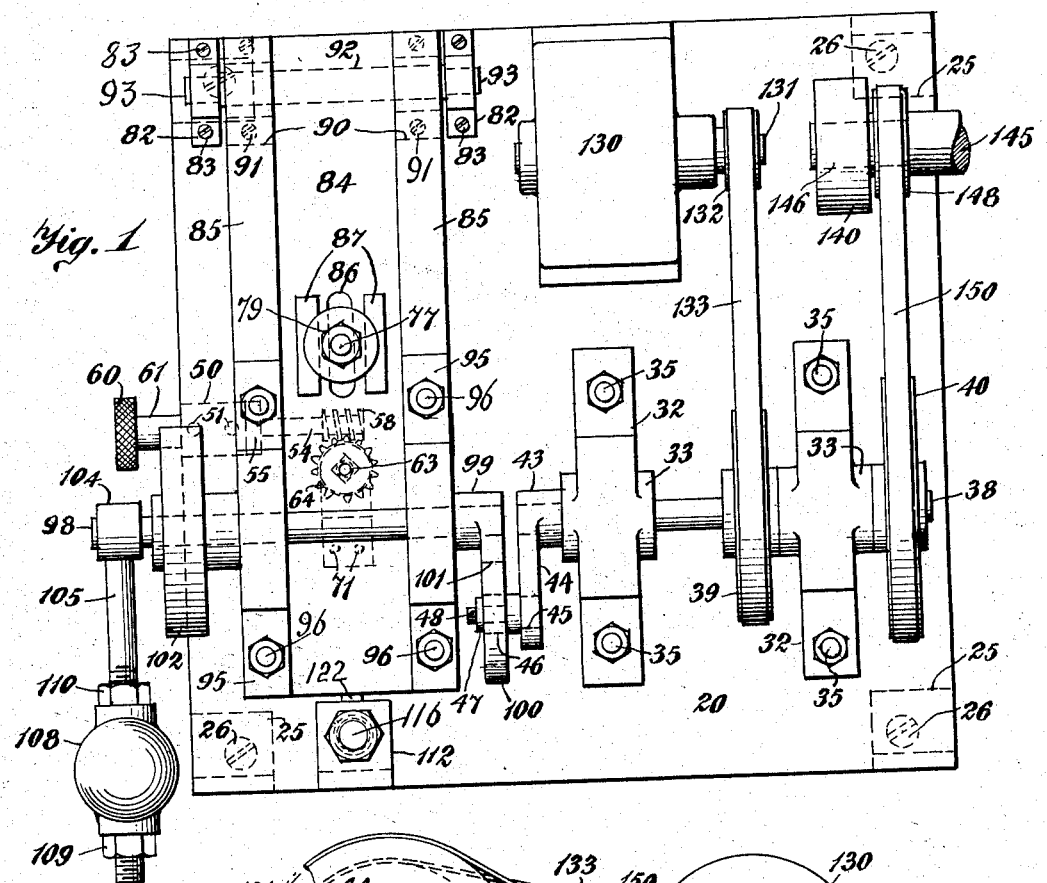

2,108,315

UNITED STATES PATENT OFFICE 2,108,315

ROTATING SHAFT CONTROLLING APPARATUS

Vincent Liguori, Bayonne, N. J.

Application July 11, 1936, Serial No. 90,209

4 Claims. (Cl. 74—1)

This invention relates to a rotating shaft controlling apparatus.

The object of the invention is the production of an apparatus, by means of which a uniform speed of rotation can be imparted to a shaft without the use of a fly wheel.

The second object of the invention is the production of an apparatus by means of which a uniform speed of rotation is imparted to a shaft, and which will save the power required to turn the usual fly wheel used to control the rotations of said shaft, and if connected to a moving vehicle will also save the power required to transport said wheel.

In the accompanying drawing Fig. 1 represents a top view of an exemplification of the rotating shaft controlling apparatus and Fig. 2 shows a right hand view of Fig. 1 with portions in vertical section and portions broken away.

A base plate 20, is supported on the channel shaped feet 25 and fastened thereto by the screw bolts 26. The feet 25 are fastened to the support 30 by the screw bolts 31.

Similar journal brackets 32 having the journal bearings 33 are supported upon the base plate 20 and fastened thereto by the bolts 35.

A main shaft 38 is journaled in the journal bearings 33. Pulleys 39 and 40 are fastened to the shaft 38. At one end of the shaft 38 is fastened the hub 43 of the arm or crank 44. A journal pin 45 extends from the swinging end of the arm 44, and has journaled thereon the roller 46. A washer 47 is supported on the outer end of the journal pin 45, and a pin 48 extends through the pin 45 to maintain said washer 47 and roller in operative position.

To the lower face of the base plate 20 is fastened the journal block 50, by means of the screws 51. A worm shaft 54 is journaled in the journal block 50 and has fastened thereto the collar 55, which bears against the block 50. To one end of the shaft 54 is fastened the worm 58. An operating disc 60 is shown with the shank 61 and the latter is fastened to the worm shaft 54. A vertical threaded regulating shaft 62 is in engagement with a threaded opening in the base plate 20. The shaft 62 has a square lower portion 63 which slidably engages the worm wheel 64, having the projections 65 which are cylindrical on their outer faces. A journal bracket 66 is indicated with the annular portion 67 and the upper portion 68. The annular portion 67 engages the projection 65 on the bottom side of the worm wheel 64. A journal bracket 69 is indicated with the annular portion 70. The latter engages the projection 65 at the upper face of the worm wheel 64. The bracket 69 bears on the portion 68 of the journal bracket 66. A pair of screws 71 clamp both the journal brackets 66 and 69 to the base plate 20. To the top end of the shaft 62 is fastened the disc shaped head 73, to which is fastened the flexible bumper disc 74. A regulating screw 77 is in threaded engagement with an opening in the base plate 20, and is adjustably clamped to the latter by means of the nut 78. At the upper portion of the screw 77 is supported the nut 79 with the bumper disc 80 integral therewith.

A pair of journal brackets 82 are fastened to the upper face of the base plate 20 by means of the screws 83.

An oscillating controlling beam 84 is indicated with the longitudinal strengthening ribs 85 and the longitudinal opening 86. Upon the upper face of the beam 84 and on the opposite sides of the opening 86 are secured the pair of bumper pads 87 of flexible material. The screw 77 extends through the opening 86.

To the lower face of one end of the beam 84 are bolted the journal brackets 90, by means of the screws 91. A shaft 92 is indicated with the ends 93, which latter are supported in the journal brackets 82. The body portion of the shaft 92 is supported in the journal brackets 90. By means of the shaft 92 and its coacting journal brackets the beam 84 is hinged at one end thereof to the base plate 20. Upon the ribs 85 of the beam 84 are fastened the pair of similar journal brackets 95 by means of the bolts 96.

In the journal brackets 95 is journaled the controlling shaft 98. To one end of the shaft 98 is fastened the hub 99 of the arm 100. In the latter is indicated the elongated opening 101 for the roller 46. A pulley 102 is fastened to the shaft 98. To the outer end of the shaft 98 is fastened the hub 104 from which extends the threaded arm 105. Upon the arm 105 is adjustably secured the controlling weight 108, which latter is clamped in position by means of the nuts 109 and 110. A channel shaped supporting bracket 112 is indicated with the top member 113 and the bottom member 114. The latter is bolted to the base plate 20 by the bolt 115. A threaded stem 116 extends through the top member 113 of the bracket 112, and is adjustably clamped in place by the nuts 117 and 118. The spring 120 is suspended from the lower end of the stem 116, and a loop 121 is shown at the lower end of the said spring. A pin 122 with the nut 123 extends from the oscillating beam 84 and engages the loop 121 of the spring 120.

Supporting legs 125 extend up from the supporting plate 20. An electric motor 130 in this instance, is supported on the supporting legs 125. The armature shaft 131 of the electric motor has fastened thereto the pulley 132. A belt 133 connects the pulleys 39 and 132.

A journal bracket 140 is supported upon the supporting plate 20 and is fastened thereto by the screw bolts 141. A shaft 145 to be controlled is indicated with its journal end 146 supported in the journal bracket 140. A pulley 148 is fastened to the journal end 146, and a belt 150 connects the pulleys 40 and 148.

To utilize the shaft controlling apparatus the electric motor 130 is energized, in the usual way by means not shown. The main shaft 38 turns with the rotations of the armature shaft 131, by means of the belt 133 that connects the pulleys 39 and 132. The crank 44 revolves with the rotations of the main shaft 38. The arm 100 revolves with the crank 44 and thereby the controlling shaft 98 is turned. The arm 105 with its controlling weight 108 revolves and swings down the controlling beam 84 against the tension of the spring 120 which latter swings said beam upwardly after the arm 105 begins to swing upwardly. By means of the oscillations of the controlling beam 84 and the coaction of the arm 105 and the spring 120, the controlling shaft 98 has imparted thereto a uniform rotation, as would result from a heavy fly wheel. It will be noted that the controlling weight 108 can be clamped on the arm 105 at different distances from the axis of the controlling shaft 98, and thereby vary the moment of said weight with respect to the axis of the shaft 98. By this means the effect produced by the weight against the tension of the spring 120 can be varied.

The angle through which the beam 84 oscillates is controlled by the bumper discs 74 and 80, each of which can be positioned different distances from said beam 84.

The uniform rotation of the controlling shaft 98 is transmitted to the main shaft 38, and the latter shaft transmits its uniform rotation to the shaft 145.

The controlling shaft 98 may be rotated by turning the pulley 102, by means not shown instead of rotating it by means of the main shaft 38, and in such a case the rotations of the shaft 98 will be transmitted to the shaft 38.

Various modifications may be made in the invention and the present exemplification is to be taken as illustrative and not limitative thereof.

Having described my invention I claim:

1. In a rotating shaft controlling apparatus the combination of a base plate, a controlling beam having one end thereof hinged to the base plate, a pair of journal brackets supported on said beam, a controlling shaft journaled in said brackets, an arm extending from one end of said controlling shaft, a controlling weight carried by said arm, a supporting bracket extending up from said base plate, a spring suspended from the upper portion of the supporting bracket and the lower end of said spring connected to the controlling beam, an arm having an elongated opening extending from the other end of the controlling shaft, a pair of journal brackets extending up from the base plate, a main shaft journaled in the latter journal brackets, a crank extending from one end of the main shaft, a journal pin extending from said crank, a roller journaled on said journal pin extending into the elongated opening of said arm, means to rotate said main shaft, the rotations of the main shaft transmitted to the controlling shaft through said crank and arm, the coaction of the arm with its controlling weight and said spring oscillating said beam, a journal bracket extending up from said base plate, a shaft to be controlled journaled in the latter journal bracket and transmission means between the shaft to be controlled and the main shaft.

2. In a rotating shaft controlling apparatus the combination of a base plate, a controlling beam, a hinge connection between one end of the beam and said base plate, a supporting bracket extending up from the base plate, a stem adjustably connected to the upper end of the supporting bracket, a spring suspended from said stem, the lower end of the spring connected to the controlling beam, a pair of journal brackets extending up from said beam, a controlling shaft journaled in said journal brackets, an arm extending from one end of the controlling shaft, a controlling weight carried on said arm, a second arm extending from the other end of the controlling shaft, a main shaft journaled above said base plate, a crank extending from one end of the main shaft in connection with the said second arm of the controlling shaft and means to rotate the main shaft and thereby rotate the controlling shaft, the rotations, the controlling shaft revolving the arm having the controlling weight and the coaction of the revolutions of the latter arm with said spring oscillating said beam during the rotations of the controlling shaft.

3. In a rotating shaft controlling apparatus, the combination of a base plate, a beam with one end thereof hinged to the base plate, a controlling shaft journaled to the beam, means to oscillate the beam and simultaneously and uniformly rotate the controlling shaft, a regulating screw supported on the base plate and extending through an opening in said beam, a nut having a hub disc supported on the upper portion of the regulating screw functioning as a stop to limit the swing of the oscillating of the beam as it swings up, a regulating shaft in threaded engagement with said base plate, a bumper disc carried at the upper end of the regulating shaft and means to turn the regulating shaft to position its bumper disc at different levels, the bumper disc functioning as a stop to limit the swing of the oscillating beam as it swings down.

4. In a rotating shaft controlling apparatus the combination of a support, feet extending up from the support, a base plate supported on said feet, a beam having one end thereof hinged to the base plate, a pair of journal brackets extending up from the beam, a controlling shaft journaled in said journal brackets, a pulley fastened to said controlling shaft, adapted to have means connected thereto to turn the same, means to oscillate the beam, means to control the extent of said oscillations, a pair of journal brackets extending up from the base plate, a main shaft journaled in the latter brackets, a connection between the controlling shaft and the main shaft to turn the latter, another journal bracket extending up from the base plate, a third shaft having one end journaled in the latter bracket and means to rotate the third shaft with the rotations of the main shaft.

VINCENT LIGUORI.